July 27, 1926. 1,593,567
C. P. BYRNES
GLASS SHAPING OR FEEDING
Filed Oct. 29, 1925  2 Sheets-Sheet 1
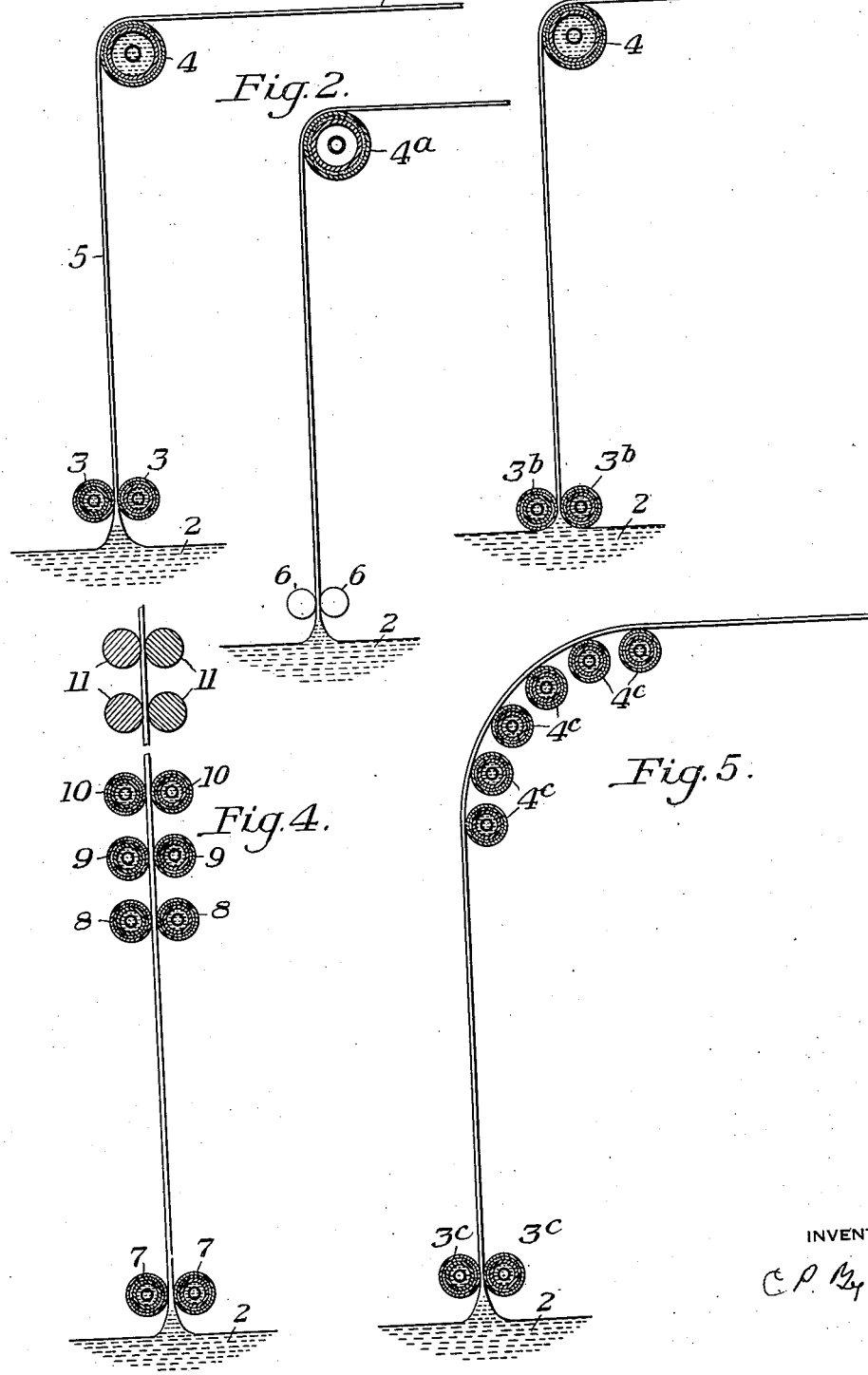
INVENTOR
C. P. Byrnes July 27, 1926.
C. P. BYRNES
1,593,567
GLASS SHAPING OR FEEDING
Filed Oct. 29, 1925
2 Sheets-Sheet 2
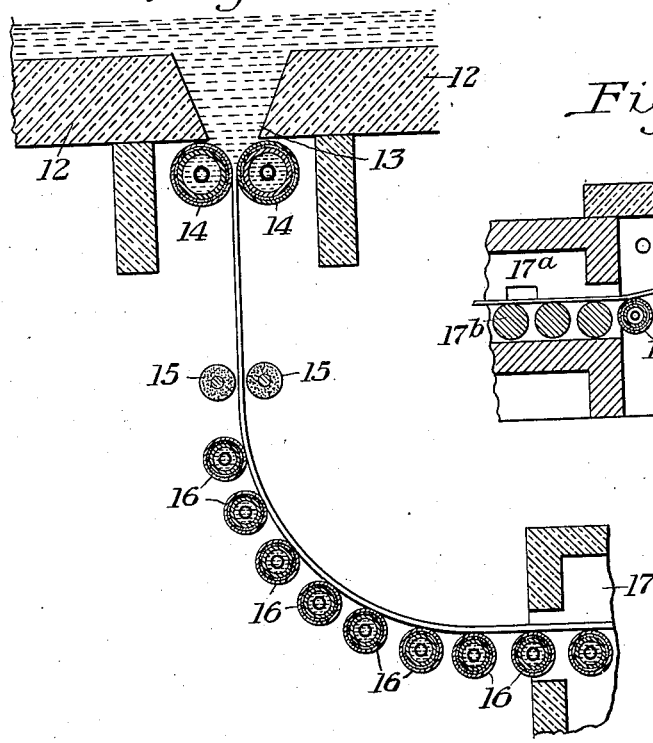
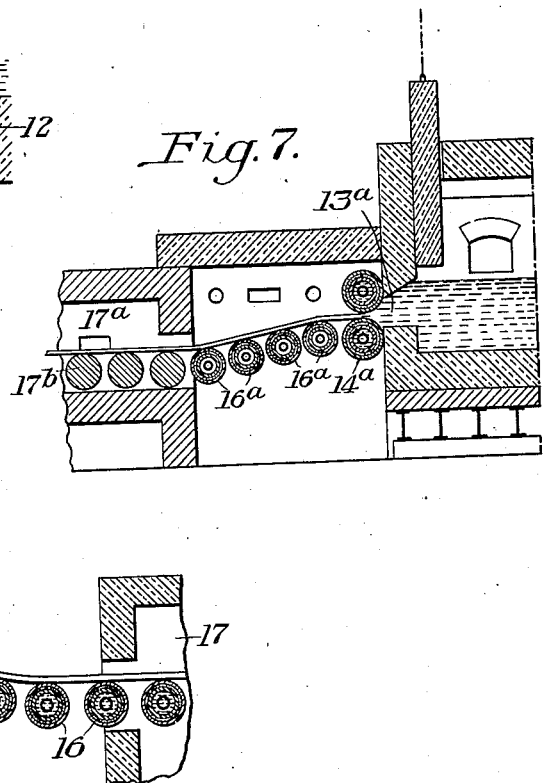
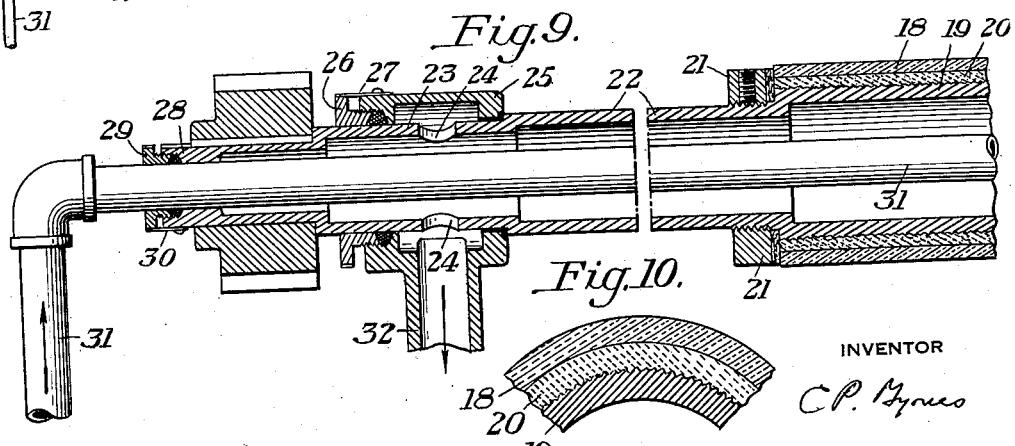
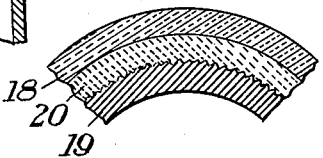
INVENTOR
C. P. Byrnes Patented July 27, 1926.

1,593,567

UNITED STATES PATENT OFFICE.

CLARENCE P. BYRNES, OF SEWICKLEY, PENNSYLVANIA.

GLASS SHAPING OR FEEDING.

Application filed October 29, 1925. Serial No. 65,554.

Figure 1 is a diagrammatic view showing one form of my invention as applied to the well known Colburn system of drawing sheet glass;

Figures 2 and 3 are views similar to Figure 1 showing other forms;

Figure 4 is a diagrammatic view showing the invention as applied to the well known Fourcault system of drawing sheet glass;

Figure 5 is a view similar to Figure 1 showing a modified form of bending apparatus;

Figure 6 is a diagrammatic view showing the invention as applied to the forming of sheet glass by downfall from a tank or forehearth;

Figure 7 is a diagrammatic view showing the invention as applied to the making of continuous plate glass;

Figure 8 is a side elevation of a forming roller employing my invention;

Figure 9 is a partial longitudinal section on a larger scale of the roller of Figure 8; and Figure 10 is a broken cross section portion of the roller.

My invention relates to the shaping or feeding of molten or plastic glass, whether the glass is afterward reshaped or not. The main feature of the invention lies in providing a shaping or feeding surface formed of the material known as "fused silica" or fused quartz or of similar material. The material known as fused silica has a high melting point of about 1700° C. My experiments have shown that it will withstand the contact of molten or plastic glass, particularly if it is maintained below its devitrifying point. By the term "devitrifying point" of the fused silica, I have reference to the place where the silica loses its glass-like character and becomes amorphous or disintegrates. This devitrification does not ordinarily occur at temperatures below 1000° C. and is very slow up to 1200° C. Above that temperature it is more rapid, especially if long contact with the heating source is maintained. Hence in my preferred form the shaping surface is maintained at a temperature below that where material devitrification occurs. This may be effectuated either in some cases by the cooling effect of the air or in others by special cooling means applied either externally or internally to the fused quartz material. Such material has a very low coefficient of expansion and is extremely resistant to sudden and great temperature changes.

My invention therefore proposes to use this material or its equivalent for contact with the molten or plastic glass, especially in shaping and feeding operations, and preferably in connection with means for maintaining the temperature of such material below its devitrifying point in cases where it would otherwise rise above this point.

In Figure 1 I have shown the invention as applied to the well known Colburn system of drawing sheet glass, 2 indicating the bath of molten glass, and 3—3 hollow rollers extending transversely of the sheet at or above the meniscus and covered with a layer of fused quartz or fused silica preferably having a polished surface. 4 indicates the usual Colburn bending roller, also preferably covered with a fused quartz layer, and 5 the sheet glass which is drawn first in a general vertical direction and thence over the roller 4 in a general horizontal direction, being preferably drawn by succeeding, gripping and drawing apparatus through a leer system in which the glass is flattened and gradually annealed. Both the rollers 3—3 and the roller 4 which contact with the sheet across its surface are preferably regulated as to temperature by special cooling devices. In the form shown these rollers are hollow and temperature regulating fluid is circulated through them to keep the fused quartz surface below the devitrifying point. These rollers are ordinarily placed within a heated chamber, and while the contact of any one portion of the fused quartz surface with the glass is of short duration, yet I prefer to employ artificial temperature regulation for the rolls. In some cases the roller may be kept below the devitrifying point of the fused quartz surface by the mere action of the atmosphere on the portions not in contact with the glass as the rollers rotate. The rollers 3—3 are preferably driven by suitable gearing or connections and the roller 4 may or may not be driven as desired.

Figure 2 is a view similar to Figure 1 except that the ordinary edge rollers 6 are employed as in the well known Colburn system. These rollers engage the thicker edge portions of the sheet and tend to hold its width. The bending roller 4ᵃ is the same as in Figure 1 and may have special cooling means or not.

In Figure 3 I show a form similar to Figure 1 except that the quartz covered rolls 3$^b$ are in contact with the meniscus of the glass rising from the glass bath and may also be in contact with the surface of the bath itself.

In Figure 4 I show the invention as applied to the well known Fourcault system of drawing continuous sheet glass in a vertical direction. In this case 7—7 are lower quartz-covered temperature-regulated rolls engaging the lower portions of the rising sheet, and 8—8, 9—9 and 10—10 are similar succeeding rollers engaging successive portions of the rising sheet. Any number of these pairs of rollers may be employed and all or any of them may extend across the sheet and engage its transverse portions as shown or may be in the form of edge rollers or of shafts with quartz-covered discs thereon. 11 represents upper sets of rollers of the ordinary type used in the Fourcault system.

In Figure 5 I show a form similar to Figure 1 except that the bending system consisting of single roller 4 is replaced by a series of quartz-covered rollers 4$^c$ so arranged as to gradually bend the sheet glass from the vertical to a horizontal direction. 3$^c$ are the lower rolls similar to the rolls 3 of Figure 1.

In the form of Figure 6, 12 indicates the floor of a tank furnace or extension or forehearth portion thereof provided with a transverse slot 13 through which the glass may flow downwardly. The flow of glass through this slot may be controlled by any suitable refractory valve or stopper coacting therewith and lying within and having a stem or stems extending above the glass. 14 indicates a pair of rollers covered with fused quartz or fused silica and preferably hollow to provide for internal temperature regulating and controlling. 15 indicates a pair of charcoal rollers extending across the width of the depending sheet or plate of glass and acting as guide rolls. 16 indicates a series of quartz-covered temperature-regulated rollers so arranged as to gradually turn the sheet or plate of glass from a descending vertical direction gradually into a horizontal direction before it enters a long tempering and annealing leer indicated at 17. In this leer or in a portion thereof the supporting rollers or supporting system may be of any desirable type.

The apparatus shown in Figure 7 is similar in some ways to that shown in Figure 6, except that the rolls 14$^a$ are placed adjacent an opening 13$^a$ in a wall of the tank furnace or an extension thereof instead of in the floor as shown in Figure 6. After the glass reaches the rolls 14$^a$ it passes over supporting rollers 16$^a$, which are preferably quartz-covered and temperature-regulated, into a leer 17$^a$. The glass may be supported in this leer on rollers 17$^b$ which may be of the ordinary type.

In Figures 8, 9 and 10 I show a preferred form of quartz-covered roller. In these figures, 18 is a continuous tubular body of fused quartz or fused silica preferably in one piece and forming the shaping surface. 19 is a metallic hollow body of the roller and 20 indicates a layer or cushion preferably of refractory material between the metal body and the quartz surface. This interposed layer may consist of any high temperature cement, such as "thermolith." This layer is preferably of refractory material having a low coefficient of expansion and of moderate or low heat conductivity. The inner metal body is also preferably made of a structural material which will stand high temperature and with a low coefficient of expansion. It may be made of alloy steel, such as those nickel steels which have a relatively high percentage of nickel and a low coefficient of expansion, or "invar" or chrome steels may be employed or nichrome or similar materials. The quartz tube is preferably concentrically positioned around the metal body and the interposed layer then fed in and allowed to harden. The surface may then be ground and polished to true concentricity. 21 indicates a clamping nut for the roller parts. The metal body has a bearing portion 22 and is continued in tubular form at 23, this portion being provided with holes 24 for outlet of fluid. This portion turns within a hollow hub 25 surrounding the same and packed to prevent exit of fluid, 26 indicating a packing gland at one end provided with a locking device 27. The further extended reduced portion 28 of the shaft is also provided with a gland 29 and a locking device 30 and this system may be the same at both ends. Both ends of the hollow shaft extensions are connected with fluid supply pipes 31 through which fluid is supplied to preferably near the center of the roller as indicated by the dotted lines in Figure 8, the fluid entering near the center of the roll and flowing out through both ends to the exit pipes, one of which is shown at 32.

As shown in Figure 10 the cylindrical metal body of the roller is preferably serrated or roughened to give better adhesion to the intervening cushion layer between it and the fused silica surface portion.

In starting the apparatus the temperature of the roller may be artificially raised, before movement of the glass begins, by circulating heating fluid through the roller. During normal operation the temperature of the roller is preferably maintained below the devitrifying point either by action of the external air or by internal circulation of the tempering fluid or in any other way which is desirable.

In any of the forms shown or in other uses of the invention, the shaping apparatus, or part thereof, may be enclosed in a refractory chamber with heating means therein if desired. The temperature of the shaping device may be regulated by electric heaters therein, particularly where air cooling is sufficient and if desired pyrometer or thermostat control devices may be employed to automatically hold the temperature of the shaping surfaces within the desired range by control of the fluid or electric current. This range is preferably below the devitrifying point of the fused quartz or fused silica and also preferably above the temperature at which the shaping surfaces will impart a material or definite chilled skin to the glass. As is well known in the use of rollers or shaping devices for glass, the application of relatively cold surfaces will chill the surface of the glass and impart a chilled skin, and in the preferable operation of my system the shaping devices are kept above this temperature where a chilled skin is formed and below the devitrifying temperature.

The invention may also be applied to the outlet nozzles of glass feeders which give a preliminary shaping, although the glass is afterwards reshaped when dropped in the molds. It may also be applied to the floaters or refractory shaping devices employed for drawing glass, as for instance in the well known Fourcault system of making sheet glass. In these cases the shaping apparatus is not in the form of a roller, but either the nozzles in the case of the feeders or the floaters in the case of the Fourcault system, may be made of hollow block form and the temperature maintained by circulation of fluid therethrough. The block may be of refractory material covered or lined with the fused quartz.

The advantages of my invention arise from the fact that the material which is in contact with the molten glass is in itself glass-like. The melting point of the fused quartz is high enough so that the use of the material is of great advantage in providing a substance which will provide a far better surface than may be secured by metal rolls. A defect which is very common in the Colburn system of drawing sheet glass is the marking or "pimpling" of the glass by the metal bending roll. The quartz roll provides a materially improved contacting surface for the glass and one which may be maintained at a sufficiently high temperature to substantially eliminate chilling of the glass as it passes thereover. This last is important, because chilling of the glass by the bending roll frequently results in wrinkling of the sheet.

In some connections the invention may be employed without artificial cooling means, where the temperature of the fused silica is not kept above the devitrifying point for considerable periods of time during its shaping or feeding action. The invention may be applied to outlet nozzles or outlet slots, the slot or nozzle enclosures being preferably hollow for the supply of a cooling fluid therethrough and many changes may be made in the form and arrangement of the specific apparatus without departing from my invention. The roller form of the invention may be cooled and also cleaned of surface dust or dirt by wipers engaging the surface or parts of it during operation of the roller. The roller may be replaced by a continuous travelling chain carrying quartz-covered blocks or plates and many other forms of the shaping or feeding element may be made. The rollers may be used in the forming of wire glass in accordance with my patents and pending applications, or in other ways where two layers of glass are brought together with wire mesh between them.

By the words "fused silica" in the claims I intend to cover fused silica, fused quartz or the equivalent thereof. Such equivalent must be in the nature of a fused homogenous continuous layer of a material of very high melting point and preferably with a low coefficient of expansion and the softening point beyond that encountered in the feeding or shaping of the glass. Carbide of tungsten may be an equivalent in this connection although I prefer the fused silica on account of its glass-like characteristics.

I claim:

1. In apparatus for shaping or feeding glass, a device having a surface of fused silica arranged to contact with the moving glass.

2. In apparatus for shaping or feeding glass, an element having a surface of fused silica arranged to contact with the moving glass, and means for moving the element while contacting with the glass.

3. In apparatus for shaping or feeding glass, an element having a surface of fused silica arranged to contact with the moving glass, and means for controlling the temperature of said fused silica.

4. In apparatus for shaping or feeding glass, an element having a surface of fused silica arranged to contact with the moving glass, and means for maintaining the fused silica below its devitrifying point.

5. In apparatus for shaping or feeding glass, a hollow element having a surface of fused silica arranged to contact with the moving glass, and means for circulating a fluid through said element.

6. In apparatus for shaping or feeding glass, a hollow moving element having a surface of fused silica arranged to contact with the moving glass, and means for circulating a fluid through said element.

7. In glass shaping or feeding apparatus, a roller having a surface of fused silica.

8. In glass shaping or feeding apparatus, a movable element arranged to contact with the moving glass, said element having a surface of fused silica.

9. In the shaping or feeding of plastic glass, the step consisting of moving the same in contact with a surface of fused silica.

10. In the shaping or feeding of plastic glass, the step consisting of moving the same in contact with a surface of fused silica, and maintaining said fused silica below its devitrifying point.

11. In the feeding of plastic glass, the step consisting of passing the glass over a surface of fused silica and changing the direction of movement thereby.

12. In the feeding of glass, the step consisting of passing the glass over a bending system having a fused silica surface.

13. In glass treating apparatus, an element having a surface portion of fused silica arranged to contact with the glass, and means for controlling the temperature of said surface portion.

14. In the feeding of plastic glass, the steps consisting of passing the glass over a surface of fused silica, and withdrawing heat from said surface.

In testimony whereof I have hereunto set my hand.

CLARENCE P. BYRNES.